(12) United States Patent
Yoo

(10) Patent No.: US 9,893,550 B2
(45) Date of Patent: Feb. 13, 2018

(54) ENERGY STORAGE SYSTEM AND STARTING METHOD THEREOF

(71) Applicant: Samsung SDI Co., Ltd., Yongin-si, Gyeonggi-do (KR)

(72) Inventor: Hwan-Sung Yoo, Yongin (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 323 days.

(21) Appl. No.: 14/562,278

(22) Filed: Dec. 5, 2014

(65) Prior Publication Data

US 2015/0180259 A1 Jun. 25, 2015

(30) Foreign Application Priority Data

Dec. 23, 2013 (KR) ........................ 10-2013-0161269

(51) Int. Cl.
*H02J 7/00* (2006.01)
*H02J 7/02* (2016.01)
(Continued)

(52) U.S. Cl.
CPC ................ *H02J 7/022* (2013.01); *H02J 3/32* (2013.01); *H02J 7/0014* (2013.01); *H02J 7/35* (2013.01);
(Continued)

(58) Field of Classification Search
CPC ....... H02J 2007/0037; H02J 2007/0039; H02J 2007/004; H02J 3/32; H02J 7/0014; H02J 7/022; H02J 7/35; Y02P 90/50
See application file for complete search history.

(56) References Cited

U.S. PATENT DOCUMENTS 8,860,252 B2 10/2014 Kang et al.
2007/0194752 A1* 8/2007 McBurney ............ H02J 7/0042
320/112
(Continued)

FOREIGN PATENT DOCUMENTS

JP 2011-097760 A 5/2011
KR 10-2006-0072584 A 6/2006
(Continued)

OTHER PUBLICATIONS

Korean Office Action dated Nov. 19, 2015 for Korean Patent Application No. KR 10-2013-0161269 which corresponds to captioned U.S. Appl. No. 14/562,278.
(Continued)

*Primary Examiner* — Nha Nguyen
(74) *Attorney, Agent, or Firm* — Knobbe Martens Olson & Bear LLP

(57) ABSTRACT

An energy storage system and a starting method thereof are disclosed. In one aspect, the energy storage system includes a battery system, a direct current (DC) contactor and a power supply. The battery system includes at least one battery rack, wherein the battery rack is configured to provide first power. The DC contactor electrically connects a current path between the battery system and a power conversion system. The power supply is electrically connected to the DC contactor. In the energy storage system, the DC contactor is configured to be turned on based on at least the first power.

17 Claims, 5 Drawing Sheets

(51) Int. Cl.
*H02J 3/32* (2006.01)
*H02J 7/35* (2006.01)

(52) U.S. Cl.
CPC . *H02J 2007/004* (2013.01); *H02J 2007/0037* (2013.01); *H02J 2007/0039* (2013.01); *Y02P 90/50* (2015.11)

(56) References Cited

U.S. PATENT DOCUMENTS

| | | | | |
|---|---|---|---|---|
| 2008/0143301 | A1* | 6/2008 | Bartilson | B60K 6/28 320/167 |
| 2008/0143462 | A1 | 6/2008 | Belisle et al. | |
| 2011/0140527 | A1 | 6/2011 | Choi | |
| 2012/0043819 | A1* | 2/2012 | Kang | H02J 3/32 307/80 |
| 2012/0280662 | A1* | 11/2012 | Krauer | H02J 7/04 320/138 |

FOREIGN PATENT DOCUMENTS

| | | |
|---|---|---|
| KR | 10-2011-0067858 A | 6/2011 |
| KR | 10-2012-0017930 A | 9/2012 |

OTHER PUBLICATIONS

Korean Registration Determination Certificate dated Nov. 25, 2016 for Korean Patent Application No. KR 10-2013-0161269.

\* cited by examiner

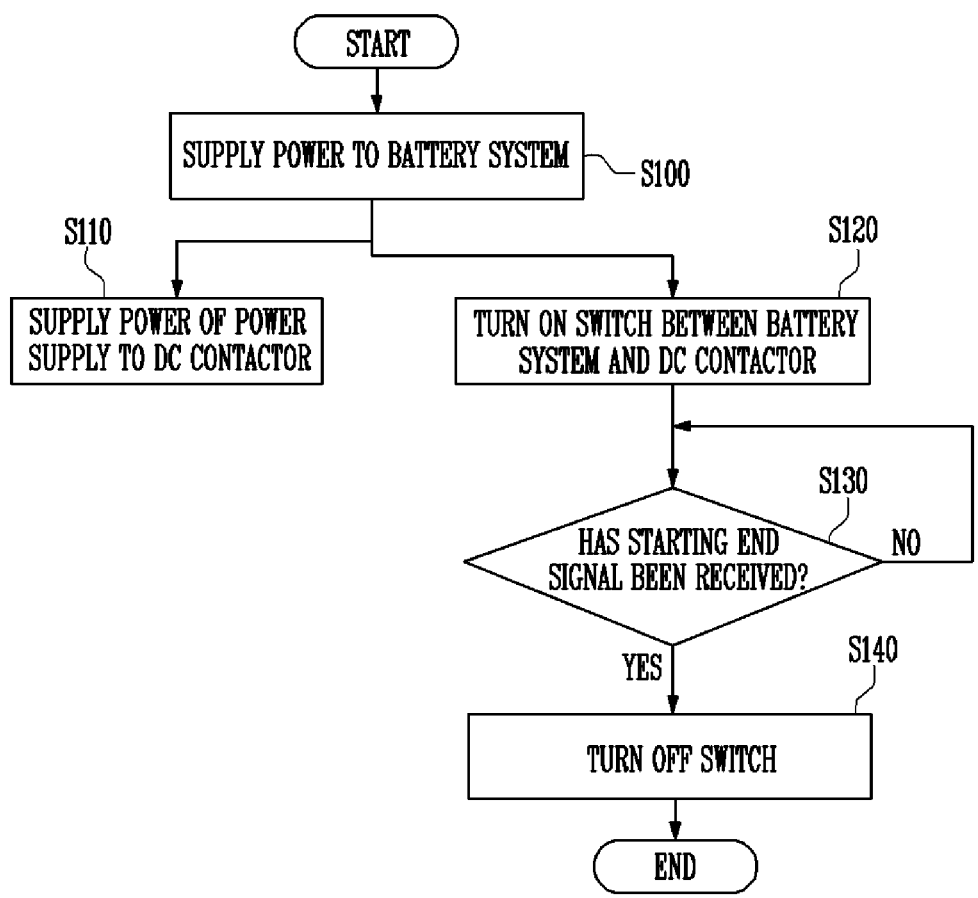

ENERGY STORAGE SYSTEM AND STARTING METHOD THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to and the benefit of Korean Patent Application No. 10-2013-0161269, filed on Dec. 23, 2013, in the Korean Intellectual Property Office, the entire contents of which are incorporated herein by reference in their entirety.

BACKGROUND

Field

The described technology generally relates to an energy storage system and a starting method thereof.

Description of the Related Technology

Because of increased awareness in environmental issues, interest in a system that can store energy and efficiently use the stored energy has increased. In addition, interest in a renewable energy that does not pollute the environment has also increased. An energy storage system that connects to an existing grid, a renewable energy source, and a battery system that stores power are being researched and developed to cope with today's environmental changes.

The energy storage system includes a battery system for storing power, and a power conversion system for appropriately converting and supplying power of the battery system, the power generation system, and the grid.

A DC contactor electrically connecting a high current terminal between the battery system and the power conversion system is used to start the energy storage system. Because the DC contactor needs a high current to start the energy storage system, a malfunction can occur in the energy storage system.

SUMMARY OF CERTAIN INVENTIVE ASPECTS

One inventive aspect is an energy storage system and a starting method thereof that can stably perform starting of the energy storage system.

Another aspect is an energy storage system, including: a battery system configured to include one or more battery racks; a DC contactor configured to connect a high current path between the battery system and a power conversion system; and a power supply connected to the DC contactor, wherein the DC contactor is started using power of the power supply and power of the battery rack.

The energy storage system can further include a switch connected between the DC contactor and the battery system. The switch can be turned on in the starting of the DC contactor.

The battery rack can include at least one rack battery management system (BMS). The rack BMS can turn on the switch when power is supplied to the rack BMS.

The rack BMS can receive a starting end signal of the DC contactor from the DC contactor.

The rack BMS can turn off the switch when receiving the starting end signal.

The energy storage system can further include a converter connected between the DC contactor and the switch, to convert the level of power stored in the battery rack into a voltage level required by the DC contactor.

The converter can be a DC-DC converter.

The power supply can be a switched-mode power supply (SMPS).

Another aspect is a method of starting an energy storage system by connecting a high current path between a power conversion system and a battery system including one or more battery racks in the energy storage system, the method including: supplying power for starting the battery system; and starting a DC contactor connected on the high current path between the battery system and the power conversion system, using power of a power supply and power of the battery rack, when power is supplied to the battery system.

The battery rack can include at least one rack BMS. The rack BMS can control a switch connected between the battery system and the DC contactor so that the power of the battery rack is supplied to the DC contactor.

The starting of the DC contactor can include turning on, by the rack BMS, the switch when power is supplied to the rack BMS.

The starting of the DC contactor can further include turning off, by the rack BMS, the switch when the rack BMS receives a starting end signal from the DC contactor.

Another aspect is an energy storage system including a battery system, direct current (DC) contactor and a power supply. The battery system includes at least one battery rack, wherein the battery rack is configured to provide first power. The direct current (DC) contactor is configured to i) electrically connect a current path between the battery system and a power conversion system and ii) be turned on based on at least the first power.

The above energy storage system further comprises a switch electrically connected between the DC contactor and the battery system, wherein the switch is configured to be turned on when the DC contactor is turned on. In the above energy storage system, the battery rack includes at least one rack battery management system (BMS). In the above energy storage system, the rack BMS is configured to turn on the switch when the rack BMS receives power. In the above energy storage system, the rack BMS is further configured to receive a starting end signal from the DC contactor. In the above energy storage system, the rack BMS is further configured to turn off the switch based on the starting end signal.

The above energy storage system further comprises a converter connected between the DC contactor and the switch, wherein the converter is configured to convert the first power into a voltage configured to turn on the DC contactor. In the above energy storage system, the converter is a DC-DC converter. The above system further comprises a power supply electrically connected to the DC contactor and configured to provide second power, wherein the DC contactor is further configured to be turned on based on the first and second power. In the above energy storage system, the power supply is a switched-mode power supply (SMPS). In the above energy storage system, the DC contactor is configured to be turned on based on both the first and second power.

Another aspect is a method of operating an energy storage system, the method comprising receiving first power from a battery system, connecting, via a direct current (DC) contactor, a current path between the battery system and a power conversion system, and turning on the DC contactor based at least on the first power.

In the above method, the battery system includes at least one battery rack, wherein the battery rack includes at least one rack battery management system (BMS), and wherein the rack BMS controls a switch electrically connected between the battery system and the DC contactor. In the above method, the turning on comprises enabling the switch when power is supplied to the rack BMS. The above method further comprises turning off the switch when the rack BMS receives a starting end signal from the DC contactor.

The above method further comprises receiving second power from a power supply, wherein the DC contactor is turned on based on the first and second power. The above method further comprises controlling the battery system not to provide the first power once the DC contactor is turned on.

Another aspect is a method of operating an energy storage system comprising connecting, via a direct current (DC) contactor, a current path between a battery system and a power conversion system, starting the DC contactor based at least on first power supplied from the battery system, and stopping the battery system from supplying the first power based on a starting end signal received from the DC contactor.

The above method further comprises receiving second power from a power supply, wherein the starting is performed based on both the first and second power. The above method further comprises electrically connecting the DC contactor to the battery system via a switch.

According to some embodiments, it is possible to stably start the energy storage system.

BRIEF DESCRIPTION OF THE DRAWINGS

FIG. 6 is a flowchart illustrating a starting method of the energy storage system according to the embodiment.

DETAILED DESCRIPTION OF CERTAIN INVENTIVE EMBODIMENTS

Figure 1:
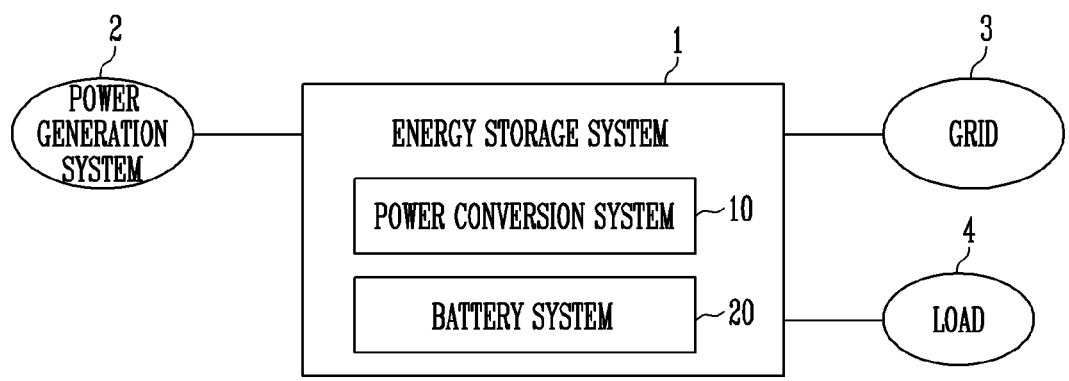
FIG. 1 is a diagram schematically illustrating an energy storage system and peripheral components according to an embodiment.

In the following detailed description, only certain exemplary embodiments of the described technology have been shown and described, simply by way of illustration. As those skilled in the art would realize, the described embodiments can be modified in various different ways, all without departing from the spirit or scope of the described technology. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Example embodiments will now be described more fully hereinafter with reference to the accompanying drawings; however, they can be embodied in different forms and should not be construed as limited to the embodiments set forth herein. Rather, these embodiments are provided so that this disclosure will be thorough and complete, and will fully convey the scope of the example embodiments to those skilled in the art. In this disclosure, the term "substantially" means completely, almost completely or to any significant degree.

In the drawing figures, dimensions can be exaggerated for clarity of illustration. It will be understood that when an element is referred to as being "between" two elements, it can be the only element between the two elements, or one or more intervening elements can also be present. Like reference numerals refer to like elements throughout.

FIG. 1 is a diagram schematically illustrating an energy storage system 1 and peripheral components according to an embodiment.

Referring to FIG. 1, the energy storage system 1 supplies power to a load 4 in connection with a power generation system 2 and a grid 3.

The power generation system 2 generates power using an energy source. The power generation system 2 supplies the generated power to the energy storage system 1. The power generation system 2 can be a solar power generation system, a wind power generation system, a tidal power generation system, a geothermal power generation system, or the like. However, this is merely illustrative, and the power generation system 2 is not limited to the above examples. The generated power can be renewable energy such as solar heat or subterranean heat. For example, a solar cell that generates electrical energy using sunlight can be installed in each house or factory. Hence, the solar cell can be the energy storage system 1 distributed in each house or factory. The power generation system 2 can include a high-capacity energy system that includes a plurality of power generation modules connected in parallel and/or series. The high-capacity energy system generates power for each power generation module.

The grid 3 includes a power plant, a substation, power lines, and the like. When the grid 3 is in a normal state, the grid 3 supplies power to the energy storage system 1, which then supplies the power to the load 4 and/or a battery system 20. In addition, the grid 3 receives power from the energy storage system 1. In some embodiments, when the grid 3 is in an abnormal state, the grid 3 does not supply power to the energy storage system 1, and the energy storage system 1 does not supply power to the grid 3.

The load 4 consumes power generated by the power generation system 2, power stored in the battery system 20, or power supplied from the grid 3. A house, a factory or the like can be an example of the load 4.

The energy storage system 1 includes the battery system 20 that can store power. The energy storage system 1 also includes a power conversion system 10 that can convert power received from the battery system 20, the power generation system 2 and the grid 3 into a suitable form and supply the converted form of the power.

The energy storage system 1 can store power generated by the power generation system 2 or the power supplied from the grid 3 in the battery system 20 and supply the power to the grid 3. For example, when the grid 3 is in the abnormal state such as a power failure in the grid 3, the energy storage system 1 can supply power to the load 4 by performing, for example, an uninterruptible power supply (UPS) operation. Even when the grid 3 is in the normal state, the energy storage system 1 can supply power generated by the power generation system 2 or power stored in the battery system 20 to the load 4.

Figure 2:
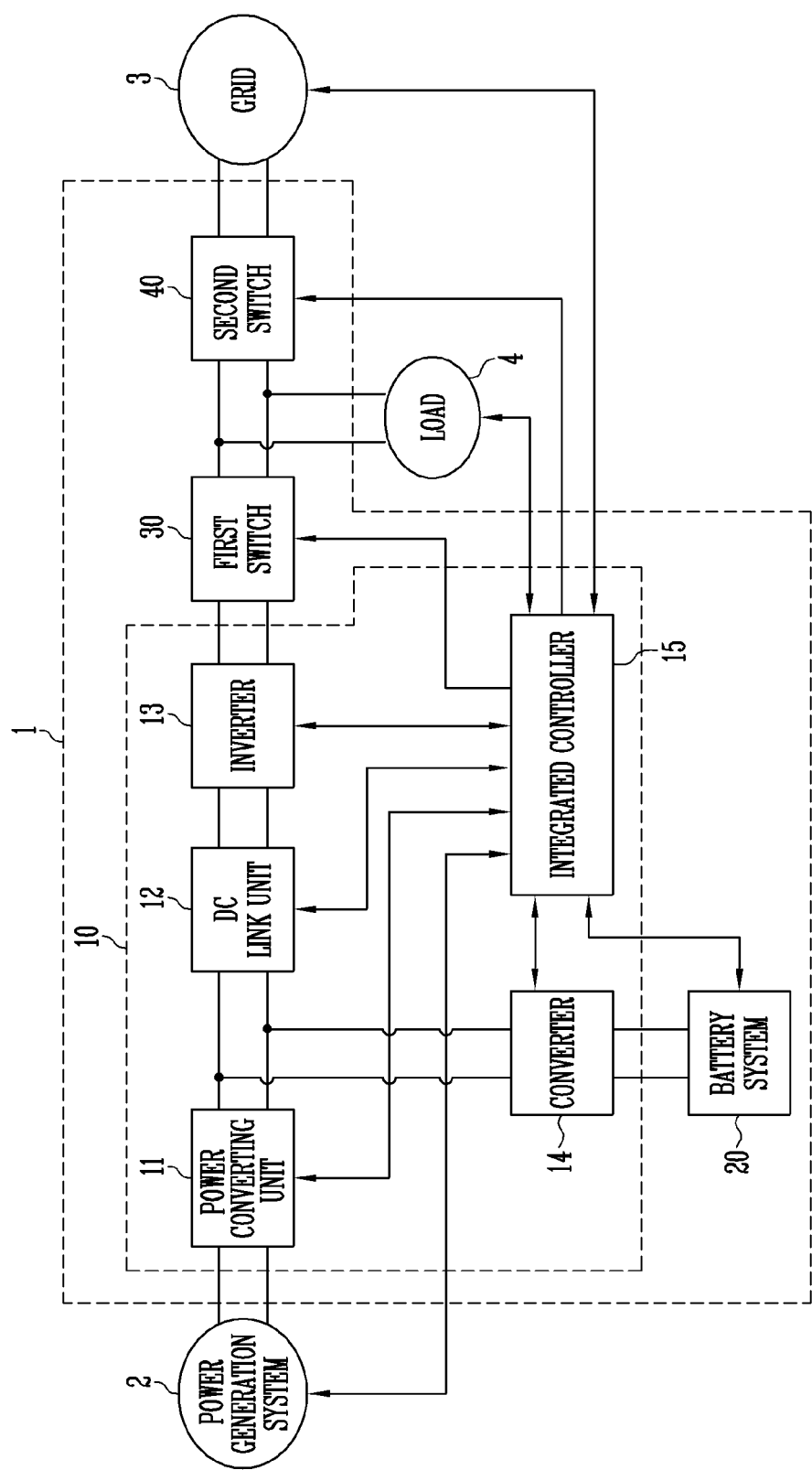
FIG. 2 is a block diagram illustrating the configuration of an energy storage system according to an embodiment.

FIG. 2 is a block diagram illustrating the configuration of the energy storage system 1 according to an embodiment.

Referring to FIG. 2, the energy storage system 1 includes the power conversion system 10, the battery system 20, a first switch 30, and a second switch 40.

The power conversion system 10 converts the received power into a suitable form for the grid 3, the load 4, and the battery system 20. The power conversion system 10 performs power conversion to and from an input/output terminal. Here, the power conversion can be at least one of between DC and AC and between first and second voltages. The power conversion system 10 supplies the converted power to an appropriate destination according to an operation mode based at least in part on an integrated controller 15. The power conversion system 10 includes a power converting unit or power converter 11, a DC link unit 12, an inverter 13, a converter 14, and the integrated controller 15.

The power converting unit 11 is electrically connected between the power generation system 2 and the DC link unit 12. The power converting unit 11 delivers power generated by the power generation system 2 to the DC link unit 12. An output voltage from the power converting unit 11 is a DC link voltage.

The power converting unit 11 can include a power conversion circuit, such as a converter or a rectifier circuit, according to the type of the power generation system 2. For example, when the power generation system 2 generates DC power, the power converting unit 11 can include a converter for converting the voltage level of the DC power of the power generation system 2 into that of the DC link unit 12. When the power generation system 2 generates AC power, the power converting unit 11 can be a rectifier circuit for converting the AC power into DC power. When the power generation system 2 is a solar power generation system, the power converting unit 11 can include a maximum power point tracking (MPPT) converter. The MPPT converter performs MPPT control so as to obtain maximum power output from the power generation system 2 according to an amount of solar radiation, temperature or the like. When the power generation system 2 generates no power, the operation of the power converting unit 11 can be stopped to minimize power consumption.

The DC link voltage can become unstable because of an instantaneous voltage drop of the power generation system 2 or the grid 3, a sudden change or a high level of power demand of the load 4, etc. However, the DC link voltage can be stabilized to normally operate the inverter 13 and the converter 14. The DC link unit 12 is electrically connected between the power converting unit 11 and the inverter 13 to maintain the DC link voltage. The DC link unit 12 can include, for example, a mass storage capacitor, etc.

The inverter 13 can be a power converting device electrically connected between the DC link unit 12 and the first switch 30. The inverter 13 can include a converter and/or a rectifier circuit. In a discharging mode, the converter converts the DC output voltage from the DC link unit 12 into an AC voltage for the grid 3. In a charging mode, the rectifier circuit rectifies the AC voltage output from the grid 3 and converts the rectified AC voltage into a DC link voltage so that power from the grid 3 can be stored in the battery system 20. That is, the inverter 13 can be a bidirectional inverter in which directions of input and output are changeable.

The inverter 13 can include a filter for removing harmonics from the AC voltage output to the grid 3. Also, the inverter 13 can include a phase-locked loop (PLL) circuit for matching the phase of the AC voltage output from the inverter 13 to the phase of the AC voltage of the grid 3 in order to prevent reactive power loss. In addition, the inverter 13 can perform other functions such as restriction of voltage variation range, power factor correction, removal of DC components, and protection against transient phenomena. When the inverter 13 is not used, the operation of the inverter 13 can be stopped so as to substantially minimize power consumption.

The converter 14 can be a power converting device that is connected between the DC link unit 12 and the battery system 20. The converter 14 includes one or more DC-DC converters. In the discharging mode, the DC-DC converter converts the voltage of the power output from the battery system 20 into a DC link voltage for the inverter 13. In the charging mode, the DC-DC converter converts the voltage of the power output from the power converting unit 11 or the inverter 13 into a voltage for the battery system 20. That is, the converter 14 can be a bidirectional converter in which directions of input and output are changeable. When the converter 14 is not used to charge or discharge the battery system 20, the operation of the converter 14 can be stopped so as to minimize power consumption.

The integrated controller 15 monitors states of the power generation system 2, the grid 3, the battery system 20 and the load 4. The integrated controller 15 also controls operations of the power converting unit 11, the inverter 13, the converter 14, the battery system 20, the first switch 30, and the second switch 40 according to monitoring results. The integrated controller 15 can monitor whether a power failure occurs in the grid 3, whether the power generation system 2 generates power, an amount of power generated by the power generation system 2, a charge state of the battery system 20, an amount of power consumed by the load 4, time, and the like. For example, when power to be supplied to the load 4 is insufficient, the integrated controller 15 can control the load 4 to determine priorities for devices that use power included in the load 4 and to supply power to the devices that use power having high priorities.

The first and second switches 30 and 40 are electrically connected in series between the inverter 13 and the grid 3. The first and second switches 30 and 40 can control the flow of current between the power generation system 2 and the grid 3 by being turned on or off by the integrated controller 15. The first and second switches 30 and 40 can be turned on or off according to states of the power generation system 2, the grid 3 and the battery system 20.

For example, in order to supply power from the power generation system 2 and/or the battery system 20 to the load 4 or to supply power from the grid 3 to the battery system 20, the first switch 30 is turned on. In order to supply power from the power generation system 2 and/or the battery system 20 to the grid 3 or to supply power from the grid 3 to the load 4 and/or the battery system 20, the second switch 40 is turned on. Switching devices such as relays that can endure a large current can be used as the first and second switches 30 and 40.

When a power failure occurs in the grid 3, the second switch 40 is turned off so that the first switch 30 is turned on. That is, power from the power generation system 2 and/or the battery system 20 is supplied to the load 4, and the power supplied to the load 4 can also be prevented from flowing into the grid 3. The isolation of the energy storage system 1 from the grid 3, in which the power failure occurs, can prevent the energy storage system 1 from supplying power to the grid 3. Accordingly, when a worker tries to fix the failure in the grid 3, the worker will not receive an electric shock from the power of the energy storage system 1.

The battery system 20 can include a portion for storing power and a portion for controlling and protecting the portion for storing power. Hereinafter, the battery system 20 will be described in detail with reference to FIG. 3.

Figure 3:
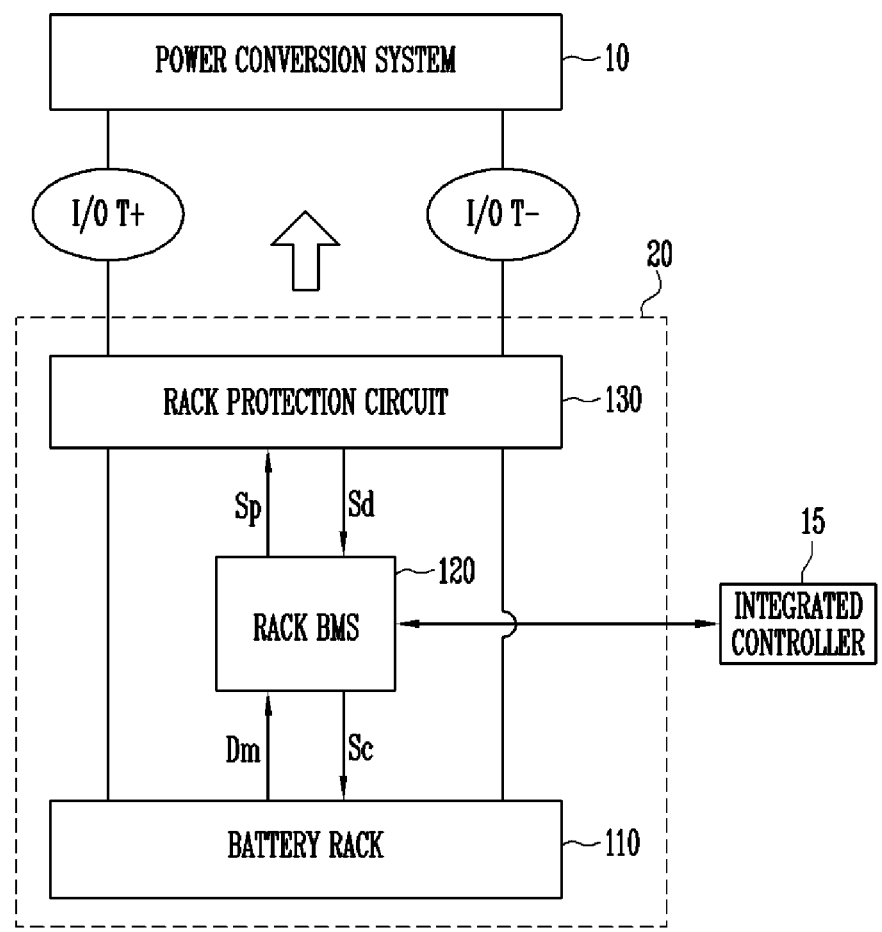
FIG. 3 is a diagram illustrating the configuration of a battery system according to an embodiment and its electrical connection to a power conversion system.

FIG. 3 is a diagram illustrating the configuration of the battery system 20 according to an embodiment and its electrical connection to the power conversion system 10.

Referring to FIG. 3, the battery system 20 includes a battery rack 110, a rack battery management system (BMS) 120 and a rack protection circuit 130.

The battery rack 110 stores power supplied from an outside, i.e., the power generation system 2 and/or the grid 3, and supplies the stored power to the power generation system 2 and/or the grid 3. The battery rack 110 can include one or more battery trays connected in series and/or parallel. Each battery tray can include a plurality of battery cells. The battery cells can use various rechargeable secondary batteries. For example, the secondary batteries used in the battery cells can include a nickel-cadmium battery, a lead acid battery, a nickel metal hydride (NiMH) battery, a lithium ion battery, a lithium polymer battery, and the like.

The rack BMS 120 is connected to the battery rack 110, and controls charging and discharging operations of the battery rack 110. The rack BMS 120 can perform functions of overcharge protection, overdischarge protection, overcurrent protection, overvoltage protection, overheat protection, cell balancing, etc. The rack BMS 120 can receive a monitoring data Dm on a voltage, a current, a temperature, a remaining amount of power, a lifetime, a state of charge, etc., from the battery rack 110. The rack BMS 120 can generate a control signal Sc according to the monitoring results, and control the rack protection circuit 130. The rack BMS 120 can apply the monitoring data Dm to the integrated controller 15, and receive a command from the integrated controller 15 to control the battery rack 110.

The rack protection circuit 130 is connected between the battery rack 110 and input/output terminals I/O T+ and I/O T− connected to the converter 14. The rack protection circuit 130 can prevent damage to the battery rack 110. The rack protection circuit 130 can receive a control signal Sp from the rack BMS 120 and control the flow of current according to the control signal Sp. The rack protection circuit 130 can measure an output voltage or output current of the battery rack 110 and transmit a measurement signal Sd to the rack BMS 120. In this case, the rack protection circuit 130 can be physically separated from the rack BMS 120. Thus, the rack BMS 120 is formed as a component separated from the rack protection circuit 130 positioned on a current path, to protect the rack BMS 120 from high current.

Figure 4:
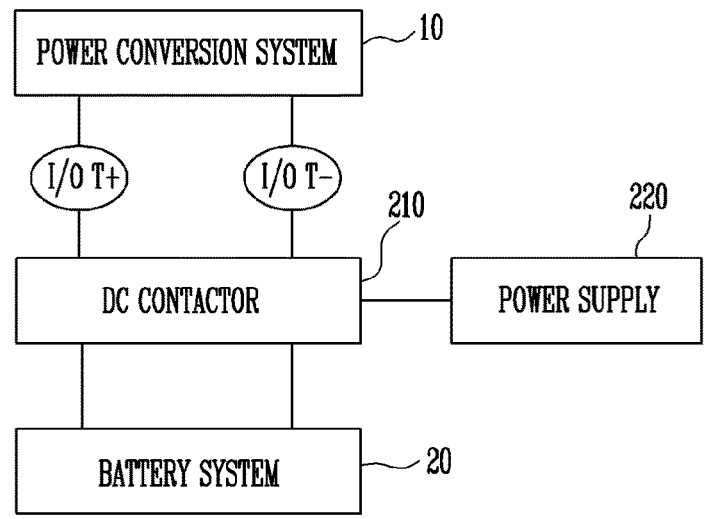
FIG. 4 is a diagram illustrating a typical electrical connection structure between a battery system and a power conversion system.

FIG. 4 is a diagram illustrating a typical electrical connection structure (not necessarily prior art) between the battery system 20 and the power conversion system 10.

Referring to FIG. 4, a DC contactor 210 that opens/closes high current is electrically connected on a current path between the battery system 20 and the power conversion system 10. When the DC contactor 210 starts so as to electrically connect between the battery system 20 and the power conversion system 10, current required by the DC contactor 210 is large. Hence, the DC contactor 210 can negatively impact the systems 10 and 20, such as cutting off communication between the systems 10 and 20. In the above connection structure, in order to prevent such a problem, a power supply 220 having a sufficiently large capacity was electrically connected to the DC contactor 210 to supply current to the DC contactor 210. However, cost increases when the high capacity power supply 220 is added.

In order to solve such a problem, in some embodiments, power of the battery system 20 is also used when starting of the DC contactor 210. Accordingly, a small-capacity power supply 220 can be used to build a system with less cost and can prevent a malfunction such as communication cutoff.

Figure 5:
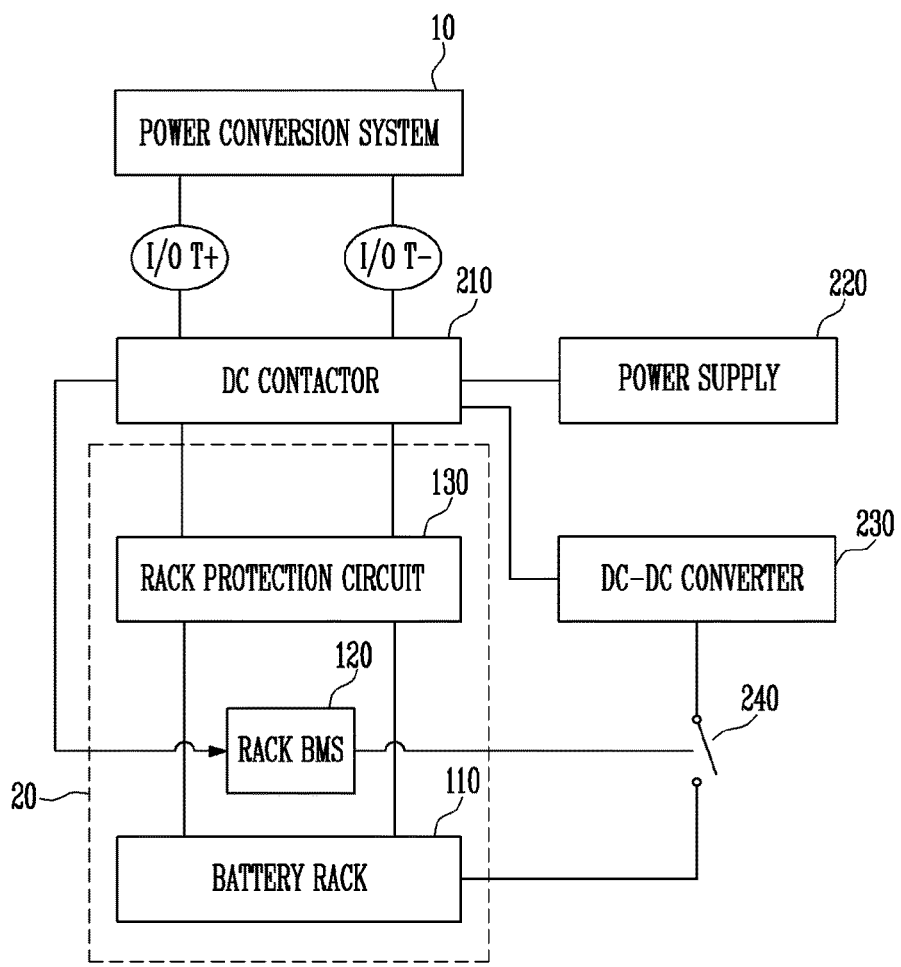
FIG. 5 is a diagram illustrating the battery system and the power conversion system according to an embodiment.

FIG. 5 is a diagram illustrating the battery system 20 and the power conversion system 10 according to an embodiment.

Referring to FIG. 5, the DC contactor 210 is electrically connected on the current path between the power conversion system 10 and the battery system 20.

The DC contactor 210 is a switch controlled using an electromagnet to switch the current path.

The power supply 220 supplies stable power to the DC contactor 210. The power supply 220 can be a switched-mode power supply (SMPS). The SMPS is a module type power supply device that changes AC electricity suitable for various kinds of devices, such as computers, communication devices and home appliance devices.

The current path is formed between the power conversion system 10 and the battery system 20. The DC contactor 210 needs a very large current to switch the current path.

Thus, power of the battery rack 110 is used together with the power from the power supply 220 when starting the DC contactor 210.

To this end, a converter 230 for converting the level of power stored in the battery rack 110 into a voltage level required by the DC contactor 210 is electrically connected between the DC contactor 210 and the battery system 20.

Here, the converter 230 can be a DC-DC converter that converts the voltage of power output from the battery rack 110 into a DC link voltage for the DC contactor 210.

The DC contactor 210 generally requires a large amount of current in the starting thereof, and therefore, power can be transmitted from the battery rack 110 to the DC contactor 210 in only the starting of the DC contactor 210.

Thus, a switch 240 is placed between the converter 230 and the battery rack 110. The on/off state of the switch 240 is controlled using the rack BMS 120.

For example, when power is applied to the rack BMS 120 by the starting of the battery system 20, the rack BMS 120 turns on the switch 240 so that the power of the battery rack 110 can be transmitted to the DC contactor 210.

When the starting of the DC contactor 210 ends so that the system is stabilized, a starting end signal is transmitted to the rack BMS 120.

When the starting end signal is received by the rack BMS 120, the rack BMS 120 turns off the switch 240 so that transmitting the power from the battery rack 110 to the DC contactor 210 stops.

That is, when the system is stabilized in about 2 or about 3 seconds after the DC contactor 210 is turned on, the DC contactor 210 no longer uses the power of the battery rack 110, and thus a problem such as reduction in the storage capacity of the battery rack 110 does not occur.

As described above, the power of the battery rack 110 is used together with the power supply in the starting of the DC contactor 210. Accordingly, it is possible to reduce cost by using the small-capacity power supply 220 and stably start the DC contactor 210.

Hereinafter, a starting method of the energy storage system 1 according to the embodiment of FIG. 5 will be described with reference to a flowchart of FIG. 6. Depending on the embodiment, additional states can be added, others removed, or the order of the states changed in FIG. 6.

In some embodiments, the FIG. 6 procedure is implemented in a conventional programming language, such as C or C++ or another suitable programming language. The program can be stored on a computer accessible storage medium of the energy storage system 1, for example, a memory (not shown) of the energy storage system 1. In certain embodiments, the storage medium includes a random access memory (RAM), hard disks, floppy disks, digital video devices, compact discs, video discs, and/or other optical storage mediums, etc. The program may be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 7/Vista/2000/9x/ME/XP, Macintosh OS, OS/2, Android, iOS and the like. In another embodiment, at least part of the procedure can be implemented with embedded software. Depending on the embodiment, additional states may be added, others removed, or the order of the states changed in FIG. 6.

Referring to FIG. 6, power is supplied to the battery system 20 (S100).

Subsequently, power is supplied from the power supply 220 to the DC contactor 210 (S110).

Substantially simultaneously, the rack BMS 120 turns on the switch 240 between the battery system 20 and the DC contactor 210 so that the power of the battery rack 110 included in the battery system 20 is supplied to the DC contactor 210 (S120).

Subsequently, it is decided whether a starting end signal of the DC contactor 210 has been received by the rack BMS 120 from the DC contactor 210 (S130).

When the starting end signal is received, the rack BMS turns off the switch 240 to block the supply of the power of the battery rack 110 to the DC contactor 210 (S140). When the starting end signal is not received, step S130 is repeated.

While the discussed invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An energy storage system, comprising:
a battery system including at least one battery rack, wherein the battery rack is configured to provide first power;
a direct current (DC) contactor configured to electrically connect a current path between the battery system and a power conversion system; and
a power supply directly connected to the DC contactor and configured to directly provide second power to the DC contactor, wherein the DC contactor is configured to be turned on by simultaneously using both the first and second powers, and wherein the first power is provided to the DC contactor through a power path different from the current path.

2. The energy storage system of claim 1, further comprising a switch configured to electrically connect the power path between the DC contactor and the battery system, wherein the switch is configured to be turned on when the DC contactor starts to electrically connect between the battery system and the power conversion system.

3. The energy storage system of claim 2, wherein the battery rack includes at least one rack battery management system (BMS), and
wherein the rack BMS is configured to turn on the switch when the rack BMS receives power.

4. The energy storage system of claim 3, wherein the rack BMS is further configured to receive a starting end signal from the DC contactor.

5. The energy storage system of claim 4, wherein the rack BMS is further configured to turn off the switch based on the starting end signal.

6. The energy storage system of claim 2, further comprising a converter connected between the DC contactor and the switch, wherein the converter is configured to convert the first power into a voltage configured to turn on the DC contactor.

7. The energy storage system of claim 6, wherein the converter is a DC-DC converter.

8. The energy storage system of claim 1, wherein the power supply is a switched-mode power supply (SMPS).

9. The energy storage system of claim 1, wherein the DC contactor is further configured to be turned on based on both the first and second power.

10. The energy storage system of claim 1, wherein the battery system and the power supply are not directly connected to each other.

11. A method of operating an energy storage system, comprising:
receiving first power from a battery system and providing the first power to a direct current (DC) contactor through a power path;
receiving second power from a power supply and directly providing the second power to the DC contactor;
turning on the DC contactor by simultaneously using both the first and second powers; and
connecting, via the DC contactor, a current path between the battery system and a power conversion system, the current path being different from the power path.

12. The method of claim 11, wherein the battery system includes at least one battery rack,
wherein the battery rack includes at least one rack battery management system (BMS), and
wherein the rack BMS controls a switch configured to electrically connected the power path between the battery system and the DC contactor.

13. The method of claim 12, wherein the turning on comprises enabling the switch when power is supplied to the rack BMS.

14. The method of claim 13, further comprising controlling the battery system not to provide the first power once the DC contactor is turned on.

15. The method of claim 12, further comprising turning off the switch when the rack BMS receives a starting end signal from the DC contactor.

16. A method of operating an energy storage system, comprising:
receiving first power from a battery system and providing the first power to a direct current (DC) contactor through a power path;
receiving second power from a power supply and directly providing the second power to the DC contactor;
starting a direct current (DC) contactor by simultaneously using both the first and second powers;

connecting, via the DC contactor, a current path between the battery system and a power conversion system, the current path being different from the power path; and stopping the battery system from supplying the first power based on a starting end signal received from the DC contactor.

17. The method of claim 16, further comprising electrically connecting the power path between the DC contactor and the battery system via a switch.

* * * * *